Oct. 21, 1924.  
J. ROBINSON ET AL  
1,512,803  
MECHANICALLY OPERATED FARM IMPLEMENT WORKING ON THE FIXED CABLE SYSTEM  
Filed Dec. 4, 1923
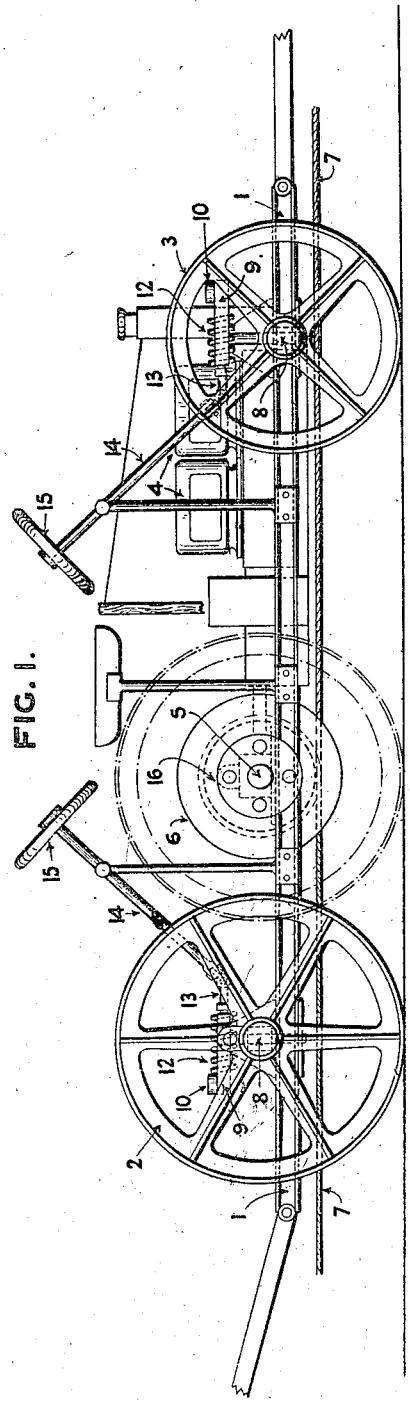
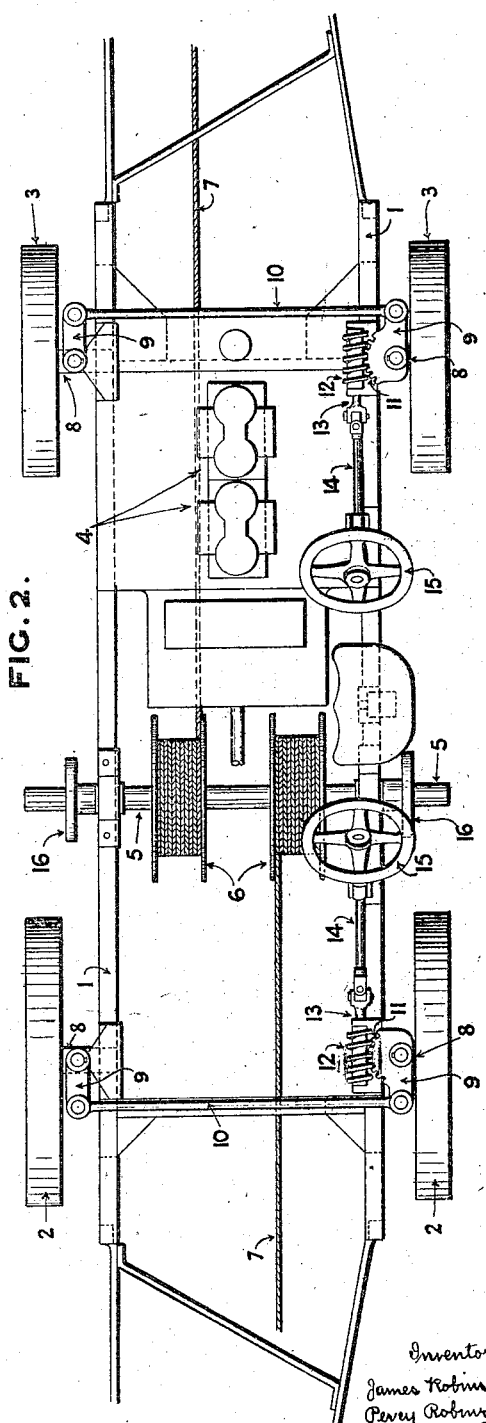

Patented Oct. 21, 1924.

1,512,803

UNITED STATES PATENT OFFICE.

JAMES ROBINSON AND PERCY ROBINSON, OF LEEDS, ENGLAND.

MECHANICALLY-OPERATED FARM IMPLEMENT WORKING ON THE FIXED-CABLE SYSTEM.

Application filed December 4, 1923. Serial No. 678,437.

*To all whom it may concern:*

Be it known that we, JAMES ROBINSON and PERCY ROBINSON, British subjects, residing at Leeds, in the county of York, England, have invented certain new and useful Improvements in Mechanically-Operated Farm Implements Working on the Fixed-Cable System, of which the following is a specification.

This invention relates to mechanically operated farm implements working on the fixed cable system, of the kind adapted to haul itself along a cable anchored at the headlands, wherein the tractor frame is mounted on four running wheels; our object being so to improve this class of machine as to materially increase its efficiency as a tractor.

According to our invention, each of the four running wheels is mounted on a stub axle, and one pair of said wheels is made capable of being removed from their stub axles and transferred on to the ends of the main or winding-drum shaft so as to render the machine capable of being converted from a rope-hauled tractor into a self-propelled tractor at will, while the two wheels of each pair are coupled together in a transverse direction through the medium of short arms and a connecting rod having one arm of each pair fitted with a toothed segment meshed with a worm whose shaft is coupled to the shaft of a hand-wheel so that both pairs of running wheels can be used for steering either separately or together when the machine is being used as a rope-hauled tractor.

The removably mounted pair of running wheels is preferably made of larger diameter than the other pair, while the main or winding-drum shaft is extended outwardly from both sides of the tractor frame so as to conveniently receive the pair of running wheels when the machine is to be used as a self-propelled tractor.

It will be understood that when the machine is being used as a rope-hauled tractor the pair of removably mounted running wheels will run loose on their stub axles, and that when transformed into a self-propelled tractor the pair of removably mounted running wheels will be keyed or clutched on to the ends of the main or winding-drum shaft.

In order that the invention may be clearly understood, we will proceed to describe the same with reference to the accompanying drawings; wherein:—

Figs. 1 and 2 are respectively a side elevation and a plan view of a tractor, the running wheels of which are arranged in accordance with our invention.

Referring to the drawings, the tractor frame 1 is mounted on running wheels 2, 2 and 3, 3 and carries an internal combustion engine 4 adapted, through mechanism not shown, to drive the main shaft 5 having the winding drums 6 mounted thereon and which carry the two-part cable or rope 7; all of ordinary construction.

According to our invention, each of the four running wheels 2, 2 and 3, 3 is mounted on a stub axle 8, and each pair of the said running wheels 2, 2 and 3, 3 are coupled together in a transverse direction through the medium of short arms 9 and a connection rod 10 having one arm 9 of each pair formed with a tooth segment 11 meshed with a worm 12 whose shaft 13 is coupled to the shaft 14 of a hand wheel 15 so that both pairs of running wheels 2, 2 and 3, 3 can be used for steering either separately or together when the machine is being used as a rope-hauled tractor.

When used as a rope-hauled tractor moving to-and-fro between two cable anchorages, the running wheels 2, 2 and 3, 3 are in position on their stub axles 8 as shown in full lines at Figs. 1 and 2 and all under the influence of the steering mechanism just described; while, when it is desired to convert the machine into a self-propelled tractor, the pair of running wheels 2, 2 are transferred from their stub axles 8 on to the ends of the main or winding-drum shaft 5 as shown in dotted lines at Fig. 1 and connected thereto by means of clutches 16 provided thereon. When so converted, the steering mechanism will have no influence on the pair of running wheels 2, 2 as they now become the driving wheels for the self-propelled tractor; the other pair of running wheels 3, 3 being still under the influence of the steering mechanism are used for steering purposes after the manner of an ordinary self-propelled tractor.

It will be seen that in employing the above described construction, the efficiency of the machine as a tractor will be considerably increased.

What we claim as our invention and desire to secure by Letters Patent is:—

1. In a tractor of the kind specified; the combination with the tractor frame and its main or winding-drum shaft, of stub axles located on the tractor frame, two pairs of running wheels mounted on said stub axles, steering mechanism in connection with each pair of said running wheels for use when the machine is being employed as a rope-hauled tractor, one pair of said running wheels being transferable from their stub axles on to the ends of the main or winding-drum shaft so as to render the machine capable of being converted from a rope-hauled tractor into a self-propelled tractor at will.

2. In a tractor of the kind specified; the combination with the tractor frame and its main or winding-drum shaft, of stub axles located on the tractor frame, two pairs of running wheels mounted on said stub axles, a coupling and steering mechanism in connection with each pair of running wheels so arranged that both pairs of running wheels can be used for steering either separately or together when the machine is being employed as a rope-hauled tractor, one pair of said running wheels being transferable from their stub axles on to the ends of the main or winding-drum shaft so as to render the machine capable of being converted from a rope-hauled tractor into a self-propelled tractor at will.

In witness whereof we have hereunto set our hands in the presence of two witnesses.

JAMES ROBINSON.
PERCY ROBINSON.

Witnesses:
JOHN JOWETT,
CYRIL BELLANY.